US010102389B2

(12) United States Patent
Faitelson et al.

(10) Patent No.: US 10,102,389 B2
(45) Date of Patent: *Oct. 16, 2018

(54) ACCESS PERMISSIONS MANAGEMENT SYSTEM AND METHOD

(71) Applicant: VARONIS SYSTEMS, INC., New York, NY (US)

(72) Inventors: Yakov Faitelson, Elkana (IL); Ohad Korkus, Herzeliya (IL); Ophir Kretzer-Katzir, Reut (IL); Yzhar Keysar, Kohav Yair (IL)

(73) Assignee: VARONIS SYSTEMS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,239

(22) Filed: Dec. 16, 2016

(65) Prior Publication Data

US 2017/0098091 A1    Apr. 6, 2017

Related U.S. Application Data

(63) Continuation of application No. 13/159,903, filed on Jun. 14, 2011, now Pat. No. 9,680,839, which is a
(Continued)

(51) Int. Cl.
G06F 17/30 (2006.01)
G06F 21/60 (2013.01)
G06F 21/62 (2013.01)

(52) U.S. Cl.
CPC ........ G06F 21/604 (2013.01); G06F 21/6218 (2013.01)

(58) Field of Classification Search
None
See application file for complete search history.

(56) References Cited

U.S. PATENT DOCUMENTS 5,465,387 A   11/1995  Mukherjee
5,761,669 A    6/1998  Montague et al.
(Continued)

FOREIGN PATENT DOCUMENTS

CN    1588889 A    3/2005
CN    1860723 A   11/2006
(Continued)

OTHER PUBLICATIONS

In English the First Chinese Office Action dated Jun. 26, 2015; Appln. No. 201180066261.8.
(Continued)

Primary Examiner — Aleksandr Kerzhner
Assistant Examiner — Eddy Cheung
(74) Attorney, Agent, or Firm — Ladas & Parry LLP

(57) ABSTRACT

An access permissions management system including a hierarchical access permissions repository including access permissions relating to data elements arranged in a data element hierarchy, wherein some of the data elements have only access permissions which are inherited from ancestral data elements, some of the multiplicity of data elements are prevented from having inherited access permissions and thus have only unique access permissions which are not inherited and some of the data elements are not prevented from having inherited access permissions and have not only inherited access permissions but also unique access permissions which are not inherited, some of which unique access permissions possibly being redundant with inherited access permissions, and an access permissions redundancy prevention engine operative to ascertain which of the unique access permissions are redundant with inherited access permissions and not to store the unique access permissions which are redundant with inherited access permissions in the repository.

2 Claims, 2 Drawing Sheets

Related U.S. Application Data continuation-in-part of application No. 13/014,762, filed on Jan. 27, 2011, now Pat. No. 8,805,884.

(60) Provisional application No. 61/477,662, filed on Apr. 21, 2011.

(56) References Cited

U.S. PATENT DOCUMENTS

| | | | |
|---|---|---|---|
| 5,889,952 A | 3/1999 | Hunnicutt et al. | |
| 5,899,991 A | 5/1999 | Karch | |
| 6,308,173 B1 | 10/2001 | Glasser et al. | |
| 6,338,082 B1 | 1/2002 | Schneider | |
| 6,393,468 B1 | 5/2002 | McGee | |
| 6,772,350 B1 | 8/2004 | Belani et al. | |
| 6,928,439 B2 | 8/2005 | Satoh | |
| 7,007,032 B1 | 2/2006 | Chen et al. | |
| 7,017,183 B1 | 3/2006 | Frey et al. | |
| 7,031,984 B2 | 4/2006 | Kawamura et al. | |
| 7,068,592 B1 | 6/2006 | Duvaut et al. | |
| 7,185,192 B1 * | 2/2007 | Kahn | G06F 21/6218 707/999.003 |
| 7,305,562 B1 | 12/2007 | Bianco et al. | |
| 7,403,925 B2 | 7/2008 | Schlesinger et al. | |
| 7,421,740 B2 | 9/2008 | Fey et al. | |
| 7,555,482 B2 | 6/2009 | Korkus | |
| 7,580,934 B2 * | 8/2009 | Futatsugi | G06F 17/30607 |
| 7,606,801 B2 | 10/2009 | Faitelson et al. | |
| 7,716,240 B2 | 5/2010 | Lim | |
| 7,743,420 B2 | 6/2010 | Shulman et al. | |
| 8,327,419 B1 * | 12/2012 | Korablev | G06F 21/6218 707/728 |
| 8,447,829 B1 * | 5/2013 | Geller | G06F 9/468 709/217 |
| 8,533,787 B2 | 9/2013 | Faitelson et al. | |
| 8,621,610 B2 | 12/2013 | Oberheide et al. | |
| 8,639,724 B1 | 1/2014 | Sorenson, III et al. | |
| 8,683,560 B1 | 3/2014 | Brooker et al. | |
| 8,805,884 B2 | 8/2014 | Faitelson et al. | |
| 8,909,673 B2 | 12/2014 | Faitelson et al. | |
| 9,680,839 B2 | 6/2017 | Faitelson et al. | |
| 2002/0002557 A1 | 1/2002 | Straube et al. | |
| 2002/0026592 A1 | 2/2002 | Gavrila et al. | |
| 2003/0051026 A1 | 3/2003 | Carter et al. | |
| 2003/0188198 A1 | 10/2003 | Holdsworth et al. | |
| 2004/0030915 A1 | 2/2004 | Sameshima et al. | |
| 2004/0186809 A1 | 9/2004 | Schlesinger et al. | |
| 2004/0249847 A1 | 12/2004 | Wang et al. | |
| 2004/0254919 A1 | 12/2004 | Giuseppini | |
| 2005/0044396 A1 | 2/2005 | Vogel et al. | |
| 2005/0044399 A1 | 2/2005 | Dorey | |
| 2005/0065823 A1 | 3/2005 | Ramraj et al. | |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0203881 A1 | 9/2005 | Sakamoto et al. | |
| 2005/0246762 A1 | 11/2005 | Girouard et al. | |
| 2005/0278334 A1 | 12/2005 | Fey et al. | |
| 2005/0278785 A1 | 12/2005 | Lieberman | |
| 2006/0037062 A1 | 2/2006 | Araujo et al. | |
| 2006/0064313 A1 | 3/2006 | Steinbarth et al. | |
| 2006/0090208 A1 | 4/2006 | Smith | |
| 2006/0184459 A1 | 8/2006 | Parida | |
| 2006/0184530 A1 | 8/2006 | Song et al. | |
| 2006/0271523 A1 * | 11/2006 | Brookler | G06F 17/218 |
| 2006/0277184 A1 | 12/2006 | Faitelson et al. | |
| 2006/0294578 A1 | 12/2006 | Burke et al. | |
| 2007/0033340 A1 | 2/2007 | Tulskie et al. | |
| 2007/0073698 A1 | 3/2007 | Kanayama et al. | |
| 2007/0094265 A1 | 4/2007 | Korkus | |
| 2007/0101387 A1 | 5/2007 | Hua et al. | |
| 2007/0112743 A1 | 5/2007 | Giampaolo et al. | |
| 2007/0136603 A1 * | 6/2007 | Kuecuekyan | G06F 21/6218 713/185 |
| 2007/0156659 A1 | 7/2007 | Lim | |
| 2007/0156693 A1 | 7/2007 | Soin et al. | |
| 2007/0198608 A1 | 8/2007 | Prahlad et al. | |
| 2007/0203872 A1 | 8/2007 | Flinn et al. | |
| 2007/0214497 A1 * | 9/2007 | Montgomery | G06F 21/6218 726/4 |
| 2007/0244899 A1 | 10/2007 | Faitelson et al. | |
| 2007/0261121 A1 | 11/2007 | Jacobson | |
| 2007/0266006 A1 | 11/2007 | Buss | |
| 2007/0276823 A1 | 11/2007 | Borden et al. | |
| 2007/0282855 A1 | 12/2007 | Chen et al. | |
| 2008/0031447 A1 | 2/2008 | Geshwind et al. | |
| 2008/0034402 A1 | 2/2008 | Botz et al. | |
| 2008/0071785 A1 | 3/2008 | Kabra et al. | |
| 2008/0104663 A1 * | 5/2008 | Tokutani | G06F 21/6218 726/1 |
| 2008/0162707 A1 | 7/2008 | Beck et al. | |
| 2008/0172720 A1 | 7/2008 | Botz et al. | |
| 2008/0270462 A1 | 10/2008 | Thomsen | |
| 2008/0271157 A1 | 10/2008 | Faitelson et al. | |
| 2008/0306954 A1 | 12/2008 | Hornqvist | |
| 2009/0100058 A1 | 4/2009 | Faitelson et al. | |
| 2009/0119298 A1 | 5/2009 | Faitelson et al. | |
| 2009/0150981 A1 | 6/2009 | Amies et al. | |
| 2009/0198892 A1 | 8/2009 | Alvarez et al. | |
| 2009/0249446 A1 | 10/2009 | Jenkins et al. | |
| 2009/0265780 A1 | 10/2009 | Korkus et al. | |
| 2009/0320088 A1 | 12/2009 | Gill et al. | |
| 2010/0011438 A1 * | 1/2010 | Bartley | G06F 21/604 726/17 |
| 2010/0023491 A1 | 1/2010 | Huang et al. | |
| 2010/0037324 A1 | 2/2010 | Grant et al. | |
| 2010/0070881 A1 | 3/2010 | Hanson et al. | |
| 2010/0262625 A1 | 10/2010 | Pittenger | |
| 2011/0060916 A1 | 3/2011 | Faitelson et al. | |
| 2011/0061093 A1 | 3/2011 | Korkus et al. | |
| 2011/0061111 A1 | 3/2011 | Faitelson et al. | |
| 2011/0184989 A1 | 7/2011 | Faitelson et al. | |
| 2011/0296490 A1 | 12/2011 | Faitelson et al. | |
| 2012/0011161 A1 * | 1/2012 | Marathe | G06F 21/604 707/785 |
| 2012/0054283 A1 | 3/2012 | Korkus et al. | |
| 2012/0078965 A1 | 3/2012 | Laitkorpi et al. | |
| 2012/0271853 A1 | 10/2012 | Faitelson et al. | |
| 2012/0271855 A1 | 10/2012 | Faitelson et al. | |
| 2012/0291100 A1 | 11/2012 | Faitelson et al. | |

FOREIGN PATENT DOCUMENTS

| | | |
|---|---|---|
| CN | 101316273 A | 12/2008 |
| CN | 101692278 A | 4/2010 |
| JP | 2007-075950 A | 3/2007 |
| JP | 2012-132276 A | 7/2012 |
| WO | 2011/030324 A1 | 3/2011 |
| WO | 2011/148376 A2 | 12/2011 |
| WO | 2011/148377 A1 | 12/2011 |
| WO | 2012101620 A1 | 8/2012 |
| WO | 2012/143920 A1 | 10/2012 |

OTHER PUBLICATIONS

In English the First Chinese Office Action dated Jun. 29, 2016; Appln. No. 2012800293603.
U.S. Appl. No. 60/688,486, filed Jun. 7, 2005.
U.S. Appl. No. 61/477,662, filed Apr. 21, 2011.
USPTO AA dated Mar. 24, 2016 in connection with U.S. Appl. No. 13/159,903.
USPTO AA dated Jun. 7, 2013 in connection with U.S. Appl. No. 13/303,826.
USPTO FOA dated Mar. 25, 2013 in connection with U.S. Appl. No. 13/303,826.
USPTO FOA dated Mar. 25, 2015 in connection with U.S. Appl. No. 13/384,452.
USPTO FOA dated Apr. 28, 2011 in connection with U.S. Appl. No. 11/871,028.
USPTO FOA dated Aug. 1, 2008 in connection with U.S. Appl. No. 11/258,256.

(56) References Cited

OTHER PUBLICATIONS

USPTO FOA dated Sep. 6, 2013 in connection with U.S. Appl. No. 13/378,115.
USPTO FOA dated Oct. 30, 2014 in connection with U.S. Appl. No. 13/159,903.
USPTO FOA dated Dec. 9, 2015 in connection with U.S. Appl. No. 13/159,903.
USPTO FOA dated Dec. 14, 2010 in connection with U.S. Appl. No. 11/789,884.
USPTO NFOA dated Jan. 15, 2013 in connection with U.S. Appl. No. 13/159,903.
USPTO NFOA dated Feb. 12, 2008 in connection with U.S. Appl. No. 11/258,256.
USPTO_ NFOA dated Mar. 13, 2014 in connection with U.S. Appl. No. 13/159,903.
USPTO NFOA dated Jun. 4, 2014 in connection with U.S. Appl. No. 13/303,826.
USPTO NFOA dated Jun. 10, 2015 in connection with U.S. Appl. No. 13/159,903.
USPTO NFOA dated Jul. 8, 2014 in connection with U.S. Appl. No. 13/378,115.
USPTO NFOA dated Jul. 9, 2010 in connection with U.S. Appl. No. 11/789,884.
USPTO NFOA dated Jul. 11, 2012 in connection with U.S. Appl. No. 13/014,762.
USPTO NFOA dated Sep. 14, 2012 in connection with U.S. Appl. No. 12/861,967.
USPTO NFOA dated Sep. 16, 2010 in connection with U.S. Appl. No. 11/871,028.
USPTO NFOA dated Sep. 19, 2012 in connection with U.S. Appl. No. 13/303,826.
USPTO NFOA dated Oct. 31, 2008 in connection with U.S. Appl. No. 11/635,736.
USPTO NFOA dated Dec. 14, 2010 in connection with U.S. Appl. No. 11/786,522.
USPTO NOA dated Feb. 10, 2017 in connection with U.S. Appl. No. 13/159,903.
USPTO NOA dated Apr. 12, 2012 in connection with U.S. Appl. No. 11/789,884.
USPTO NOA dated Jul. 11, 2014 in connection with U.S. Appl. No. 13/303,826.
USPTO NOA dated Aug. 12, 2016 in connection with U.S. Appl. No. 13/159,903.
USPTO RR dated Nov. 21, 2012 in connection with U.S. Appl. No. 13/106,023.
Ebell: "Access Control Lists—alfrescowiki" 9 pages, Jun. 5, 2008.
Varonis: DatAdvantage User Guide 71 pages, Version 1.0 Aug. 30, 2005.
Varonis: DatAdvantage User Guide 118 pages, Version 2.0 Aug. 24, 2006.
Varonis: DatAdvantage User Guide 124 pages, Version 2.5, Nov. 27, 2006.
Varonis: DatAdvantage User Guide 127 pages, Version 2.6, Dec. 15, 2006.
Varonis: DatAdvantage User Guide 131 pages, Version 2.7, Feb. 6, 2007.
Varonis: DatAdvantage User Guide 153 pages Version 3.0 Jun. 20, 2007.
Varonis: A list of database tables in DatAdvantage 2.7, Feb. 6, 2007.
Varonis: A list of database tables in DatAdvantage 3.0, Jun. 20, 2007.
Sahadeb De, et al; "Secure Access Control in a Multi-user Geodatabase", available on the Internet at the URL http://www10.qiscafe.com. 2005, 10 pages.
Findutils; "GNU Project". Free Software Foundation (FSF), 3 pages, Nov. 2006.
Genunix; "Writing Filesystems—VFS and Vnode Interfaces", 5 pages. Oct. 2007.
S.R. Kleiman; "Vnodes: An architecture for Multiple File System Types in Sun UNIX", USENIX Association: Summer Conference Proceeding, Atlanta 1986; 10 pages.
Dennis Lu, et al; "Jesse Dyer", Jul. 15, 2004, 8, pages.
Sara C. Madeira.; "Clustering, Fuzzy Clustering and Biclustering: An Overview", pp. 31 to 53, Jun. 27, 2003.
Sara C. Madeira, et al; "Biclustering Algorithms for Biological Data Analysis: A Survey", Mar. 2004; http://www.cs.princeton.edu/courses/archive/spr05/cos598E/bib/bicluster.pdf.
Varonis "Accelerating Audits with Automation: Understanding Who's Accessing Your Unstructured Data", 7 pages, Oct. 8, 2007.
Varonis: "White Paper: The Business Case for Data Governance", dated Mar. 27, 2007, 8 pages.
Alex Woodie: "Varonis Prevents Unauthorized Access to Unstructured Data", Four Hundred Stuff, vol. 7, No. 9, Jul. 31, 2007, 6 pages.
Extended European Search Report dated May 13, 2015, Appln. 11857276.7-1958/2668563 PCT/IL2011000902.
IPRP dated Jul. 30, 2013; PCT/IL2011/000902.
IPRP dated Jul. 30, 2013; PCT/IL2011/000903.
IPRP dated May 12, 2015; PCT/IL2012/000163.
ISR and WO dated May 23, 2011; PCT/IL1100065.
ISR and WO dated Jun. 14, 2011; PCT/IL1100066.
ISR and WO dated Jun. 13, 2011; PCT/IL1100076.
ISR and WO dated May 24, 2011; PCT/IL1100077.
ISR and WO dated Nov. 15, 2011; PCT/IL1100408.
ISR and WO dated Apr. 13, 2012; PCT/IL1100902.
ISR and WO dated May 20, 2010; PCT/IL2010000069.
ISR and WO dated Aug. 31, 2012; PCT/IL2012000163.
Supplementary European Search Report dated May 3, 2016; Appln. 12774249.2-1870/2700028 PCT/il2012000163.
A Patent Board Decision on Appeal dated Aug. 29, 2017, which issued during the prosecution of U.S. Appl. No. 13/378,115.

* cited by examiner

ACCESS PERMISSIONS MANAGEMENT SYSTEM AND METHOD

REFERENCE TO RELATED APPLICATIONS

Reference is made to U.S. Provisional Patent Application Ser. No. 61/477,662, filed Apr. 21, 2011 and entitled "ACCESS PERMISSIONS MANAGEMENT SYSTEM AND METHOD", the disclosure of which is hereby incorporated by reference and priority of which is hereby claimed pursuant to 37 CFR 1.78(a) (4) and (5)(i).

Reference is also made to U.S. patent application Ser. No. 13/014,762, filed Jan. 27, 2011, and entitled "AUTOMATIC RESOURCE OWNERSHIP ASSIGNMENT SYSTEMS AND METHODS", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298, 2009/0265780, 2011/0060916 and 2011/0061111; and U.S. patent application Ser. No. 12/673,691.

FIELD OF THE INVENTION

The present invention relates to access permissions management.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482, 7,606,801 and 7,743,420; and U.S. Published Patent Application Nos.: 2003/0051026; 2004/0249847; 2005/0108206; 2005/0203881; 2005/0086529; 2006/0064313; 2006/0184530; 2006/0184459; 2007/0203872; 2007/0244899; 2008/0271157; 2009/0100058; 2009/0119298; 2009/0265780; 2011/0060916 and 2011/0061111.

SUMMARY OF THE INVENTION

The present invention provides improved systems and methodologies for access permissions redundancy prevention.

There is thus provided in accordance with a preferred embodiment of the present invention an access permissions management system including a hierarchical access permissions repository including a multiplicity of access permissions relating to a multiplicity of data elements which are arranged in a data element hierarchy and wherein some of the multiplicity of data elements have associated therewith only access permissions which are inherited from data elements ancestral thereto, some of the multiplicity of data elements are prevented from having associated therewith inherited access permissions and thus have associated therewith only unique access permissions which are not inherited and some of the multiplicity of data elements are not prevented from having associated therewith inherited access permissions and have associated therewith not only inherited access permissions but also unique access permissions which are not inherited, some of which unique access permissions possibly being redundant with inherited access permissions, and an access permissions redundancy prevention engine operative to ascertain which of the unique access permissions are redundant with inherited access permissions and responsively thereto not to store the unique access permissions which are redundant with inherited access permissions in the repository.

There is also provided in accordance with another preferred embodiment of the present invention an access permissions management system including a hierarchical access permissions repository including a multiplicity of access permissions relating to a multiplicity of data elements which are arranged in a data element hierarchy and wherein some of the multiplicity of data elements are inherited data elements, which have associated therewith only access permissions which are inherited from data elements ancestral thereto, some of the multiplicity of data elements are protected data elements, which are prevented from having associated therewith inherited access permissions and thus have associated therewith only unique access permissions which are not inherited and some of the multiplicity of data elements are hybrid data elements, which are not prevented from having associated therewith inherited access permissions and have associated therewith not only inherited access permissions but also unique access permissions which are not inherited, some of which unique access permissions possibly being redundant with inherited access permissions, and an access permissions overlap prevention engine operative to ascertain which of the unique access permissions associated with a protected data element are identical to access permissions associated with a data element immediately above the protected data element in the hierarchy and responsively thereto not to store the unique access permissions which are associated with the protected data element.

There is further provided in accordance with yet another preferred embodiment of the present invention an access permissions management method including maintaining a hierarchical access permissions repository including a multiplicity of access permissions relating to a multiplicity of data elements which are arranged in a data element hierarchy and wherein some of the multiplicity of data elements have associated therewith only access permissions which are inherited from data elements ancestral thereto, some of the multiplicity of data elements are prevented from having associated therewith inherited access permissions and thus have associated therewith only unique access permissions which are not inherited and some of the multiplicity of data elements are not prevented from having associated therewith inherited access permissions and have associated therewith not only inherited access permissions but also unique access permissions which are not inherited, some of which unique access permissions possibly being redundant with inherited access permissions, and preventing access permissions redundancy by ascertaining which of the unique access permissions are redundant with inherited access permissions and responsively thereto not to store the unique access permissions which are redundant with inherited access permissions in the repository.

There is yet further provided in accordance with still another preferred embodiment of the present invention an access permissions management method including maintaining a hierarchical access permissions repository including a multiplicity of access permissions relating to a multiplicity of data elements which are arranged in a data element hierarchy and wherein some of the multiplicity of data elements are inherited data elements, which have associated therewith only access permissions which are inherited from data elements ancestral thereto, some of the multiplicity of data elements are protected data elements, which are prevented from having associated therewith inherited access permissions and thus have associated therewith only unique access permissions which are not inherited and some of the multiplicity of data elements are hybrid data elements, which are not prevented from having associated therewith inherited access permissions and have associated therewith not only inherited access permissions but also unique access permissions which are not inherited, some of which unique access permissions possibly being redundant with inherited access permissions, and preventing access permissions overlap by ascertaining which of the unique access permissions associated with a protected data element are identical to access permissions associated with a data element immediately above the protected data element in the hierarchy and responsively thereto not to store the unique access permissions which are associated with the protected data element.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
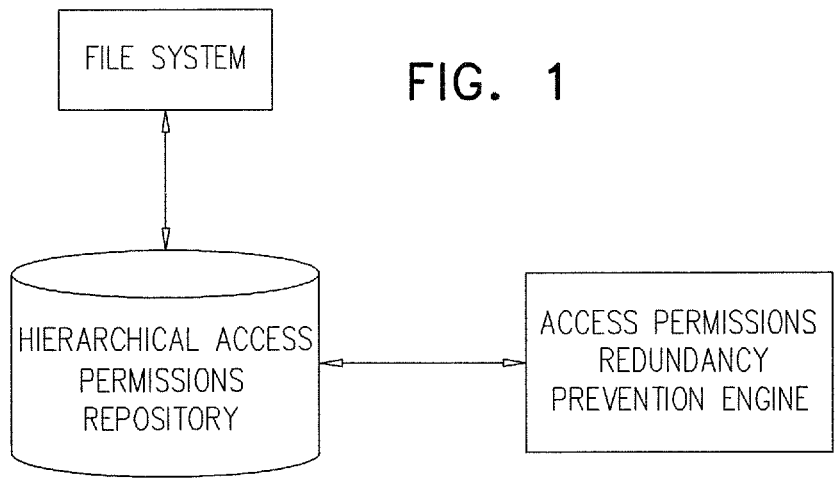
FIG. 1 is a simplified block diagram illustration of an access permissions management system, constructed and operative in accordance with a preferred embodiment of the present invention.
Figure 2:
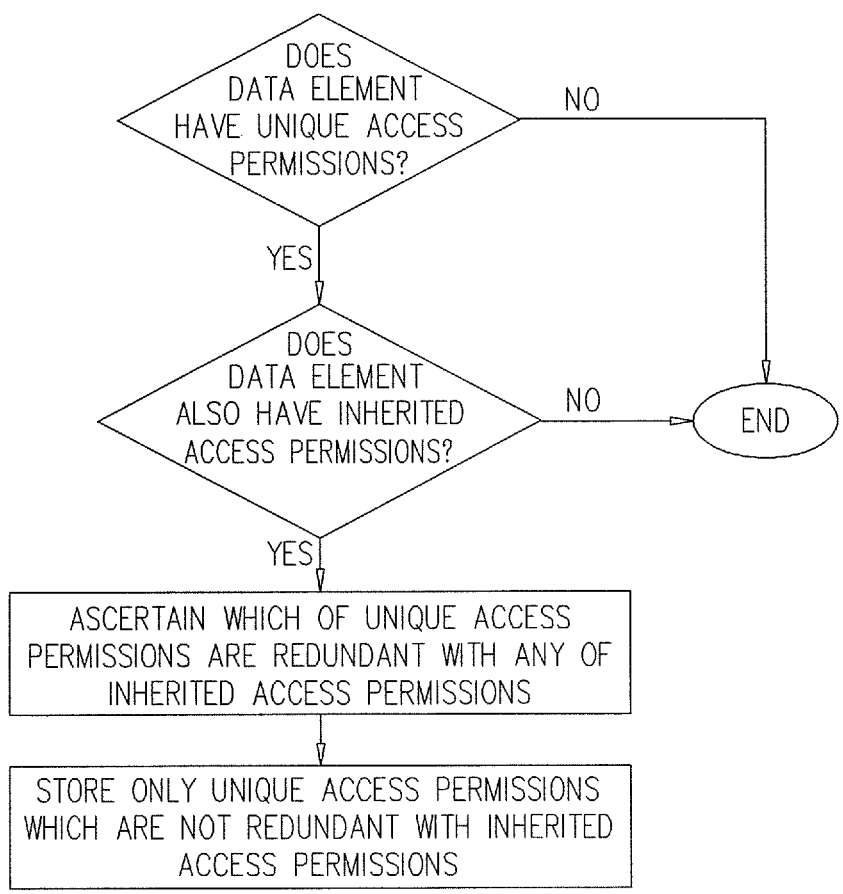
FIG. 2 is a simplified flowchart indicating steps in the operation of the access permissions management system of FIG. 1.

Reference is now made to FIG. 1, which is a simplified block diagram illustration of an access permissions management system, constructed and operative in accordance with a preferred embodiment of the present invention, and to FIG. 2, which is a simplified flowchart indicating steps in the operation of the access permissions management system of FIG. 1. The access permissions management system of FIGS. 1 & 2 is preferably suitable for operating in an enterprise computer network including multiple disparate clients, computer hardware resources and computer software resources, and a file system comprising a data element hierarchy.

Preferably, the system of FIGS. 1 & 2 includes a hierarchical access permissions repository including a multiplicity of access permissions relating to a multiplicity of data elements which are arranged in the data element hierarchy and wherein some of the multiplicity of data elements have associated therewith only access permissions which are inherited from data elements ancestral thereto, some of the multiplicity of data elements are prevented from having associated therewith inherited access permissions and thus have associated therewith only unique access permissions which are not inherited, and some of the multiplicity of data elements are not prevented from having associated therewith inherited access permissions and have associated therewith not only inherited access permissions but also unique access permissions which are not inherited, some of which unique access permissions possibly being redundant with inherited access permissions. It is appreciated that prevention of association of inherited access permissions with a data element may be accomplished, for example, by configuring of the data element, such as by an IT Administrator, as a data element which is not allowed to inherit access permissions from any of its ancestors.

In accordance with a preferred embodiment of the present invention, the system of FIGS. 1 & 2 also includes an access permissions redundancy prevention engine operative to ascertain which of the unique access permissions are redundant with inherited access permissions and responsively thereto not to store the unique access permissions which are redundant with inherited access permissions in the repository.

As shown in FIG. 2, for each data element in the data element hierarchy the system ascertains whether the data element has unique access permissions associated therewith. Thereafter, the system ascertains whether the data element also has inherited access permissions associated therewith. Thereafter, the system ascertains whether any of the unique access permissions associated with the data element are redundant with any of the inherited access permissions associated with the data element. Thereafter, for each data element, the system stores in the repository only the unique access permissions which are not redundant with any of the inherited access permissions.

Figure 3:
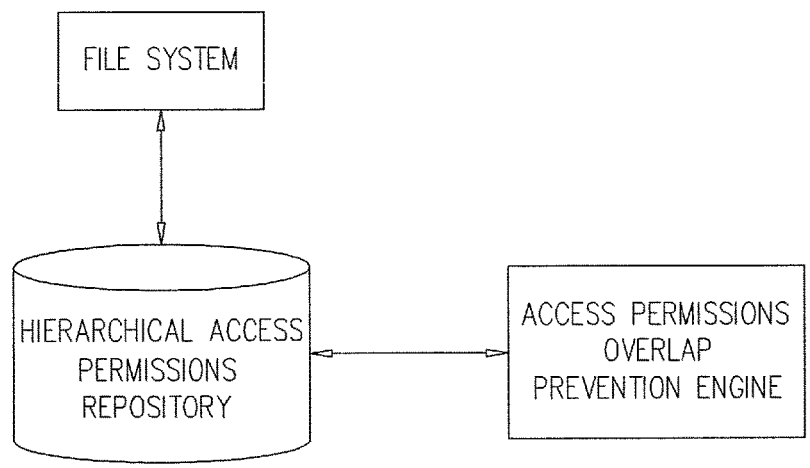
FIG. 3 is a simplified block diagram illustration of an access permissions management system, constructed and operative in accordance with another preferred embodiment of the present invention.
Figure 4:
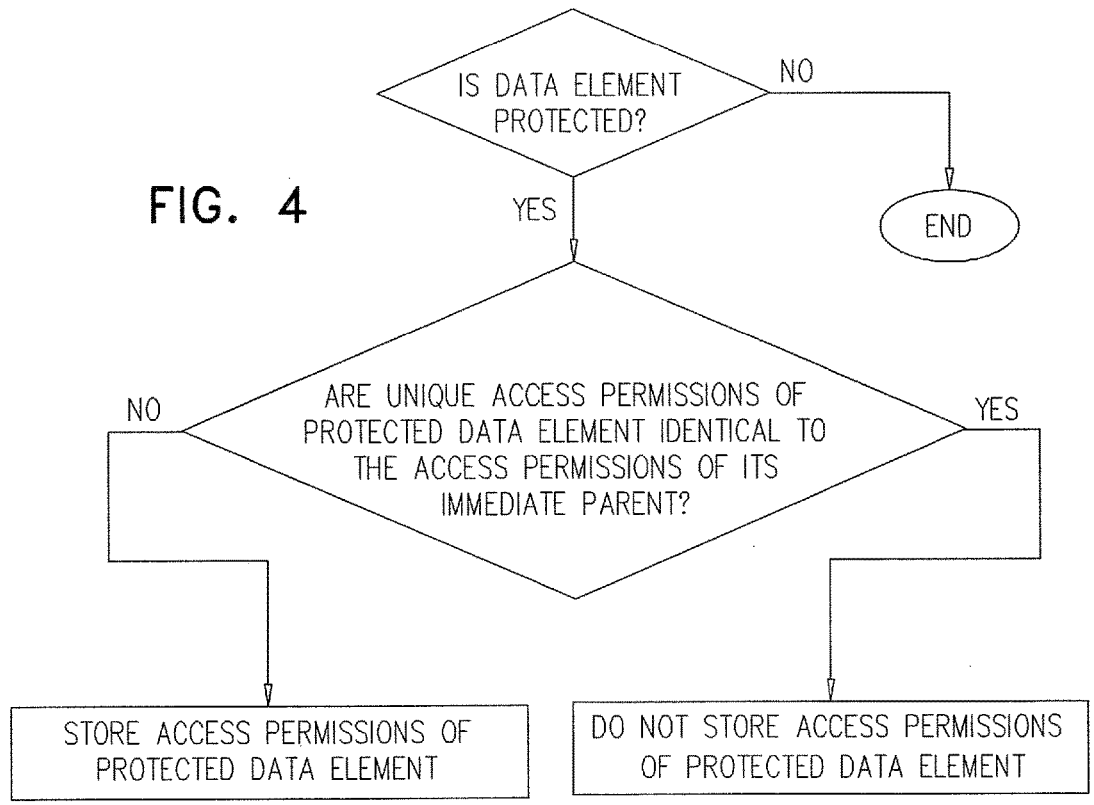
FIG. 4 is a simplified flowchart indicating steps in the operation of the access permissions management system of FIG. 3.

Reference is now made to FIG. 3, which is a simplified block diagram illustration of an access permissions management system, constructed and operative in accordance with another preferred embodiment of the present invention, and to FIG. 4, which is a simplified flowchart indicating steps in the operation of the access permissions management system of FIG. 3. The access permissions management system of FIGS. 3 & 4 is preferably suitable for operating in an enterprise computer network including multiple disparate clients, computer hardware resources and computer software resources, and a file system comprising a data element hierarchy.

Preferably, the system of FIGS. 3 & 4 includes a hierarchical access permissions repository including a multiplicity of access permissions relating to a multiplicity of data elements which are arranged in the data element hierarchy and wherein some of the multiplicity of data elements are inherited data elements, which have associated therewith only access permissions which are inherited from data elements ancestral thereto, some of the multiplicity of data elements are protected data elements, which are prevented from having associated therewith inherited access permissions and thus have associated therewith only unique access permissions which are not inherited, and some of the multiplicity of data elements are hybrid data elements, which are not prevented from having associated therewith inherited access permissions and have associated therewith not only inherited access permissions but also unique access permissions which are not inherited, some of which unique access permissions possibly being redundant with inherited access permissions.

In accordance with a preferred embodiment of the present invention, the system of FIGS. 3 & 4 also includes an access permissions overlap prevention engine operative to ascertain which of the unique access permissions associated with a protected data element are identical to access permissions associated with a data element immediately above the protected data element in the hierarchy and responsively thereto not to store the unique access permissions which are associated with the protected data element.

As shown in FIG. 4, for each protected data element in the data element hierarchy the system ascertains whether the unique access permissions associated therewith are identical to the access permissions associated with the data element immediately above the protected data element in the hierarchy. Thereafter, only for protected data elements which have unique access permissions associated therewith that are not identical to the access permissions associated with the data element immediately above the protected data element in the hierarchy, the system stores in the repository the unique access permissions associated with the protected data element.

It will be appreciated by persons skilled in the art that the present invention is not limited by what has been particularly shown and described hereinabove. Rather, the invention also includes various combinations and subcombinations of the features described hereinabove as well as modifications and variations thereof, which would occur to persons skilled in the art upon reading the foregoing and which are not in the prior art.

The invention claimed is:

1. A data governance system for use with an existing organizational file system, said data governance system comprising a non-transitory, tangible computer-readable medium in which computer program instructions are stored, which instructions, when read by a computer, cause the computer to automatically manage access permissions, said system comprising:
   a probe engine communicating with said organizational file system and being operative to collect access information from said organizational file system in an ongoing manner;
   a redundancy reducing engine receiving an output from said probe engine and providing a redundancy reduced information stream; and
   a redundancy reduced information database receiving and storing said redundancy reduced information stream;
   said redundancy-reduced information database storing information relating to a subset of a set of access permissions to said organization file system, said subset being created by said redundancy reducing engine,
   said redundancy reducing engine being operative:
      to ascertain whether there exists a first subset of said multiplicity of access permissions permitting access to a portion of said organizational file system, which permitted access is identical to access permitted by a second subset, different from said first subset, of said multiplicity of access permissions to said portion of said organizational file system, said first subset of said multiplicity of access permissions therefore being redundant; and
      responsive to said ascertaining whether any of said access permissions are redundant, to eliminate from said multiplicity of access permissions to said organizational file system, said access permissions to said organizational file system which are redundant.

2. An access permissions management method comprising:
   communicating with an organizational file system and collecting access information from said organizational file system in an ongoing manner;
   responsive to said collecting access information:
      ascertaining whether there exists a first subset of said multiplicity of access permissions permitting access to a portion of said organizational file system, which permitted access is identical to access permitted by a second subset, different from said first subset, of said multiplicity of access permissions to said portion of said organizational file system, said first subset of said multiplicity of access permissions therefore being redundant; and
      responsive to said ascertaining whether any of said access permissions are redundant, eliminating from said multiplicity of access permissions to said organizational file system, said access permissions to said organizational file system which are redundant; and
   providing and storing, a redundancy reduced information stream, said redundancy reduced information stream comprising information relating to a subset of a set of access permissions to said organizational file system.

* * * * *